United States Patent
Jordan et al.

(10) Patent No.: US 8,887,285 B2
(45) Date of Patent: Nov. 11, 2014

(54) HETEROGENEOUS SENSORS FOR NETWORK DEFENSE

(71) Applicants: Eamon Hirata Jordan, Honolulu, HI (US); Evan Joseph Kelly, Honolulu, HI (US); Kevin Barry Jordan, Honolulu, HI (US)

(72) Inventors: Eamon Hirata Jordan, Honolulu, HI (US); Evan Joseph Kelly, Honolulu, HI (US); Kevin Barry Jordan, Honolulu, HI (US)

(73) Assignee: Resurgo, LLC, Honolulu, HI (US)

( * ) Notice: Subject to any disclaimer, the term of this patent is extended or adjusted under 35 U.S.C. 154(b) by 91 days.

(21) Appl. No.: 13/828,510

(22) Filed: Mar. 14, 2013

(65) Prior Publication Data

US 2014/0283052 A1    Sep. 18, 2014

(51) Int. Cl.
*G06F 12/14* (2006.01)
*H04L 29/06* (2006.01)
*G06F 21/56* (2013.01)

(52) U.S. Cl.
CPC .......... *H04L 63/1416* (2013.01); *G06F 21/562* (2013.01); *H04L 63/1425* (2013.01); *G06F 21/56* (2013.01)
USPC ................... 726/25; 726/22; 726/23; 726/24; 713/188

(58) Field of Classification Search
CPC ..... G06F 21/562; G06F 21/56; G06F 21/561; G06F 21/55
USPC .................... 726/1, 22–29; 713/150–153, 188
See application file for complete search history.

(56) References Cited

U.S. PATENT DOCUMENTS

| | | | |
|---|---|---|---|
| 7,099,320 B1 * | 8/2006 | Salerno | 370/389 |
| 7,540,025 B2 * | 5/2009 | Tzadikario | 726/22 |
| 7,845,007 B1 * | 11/2010 | Kennis | 726/23 |
| 2006/0137009 A1 * | 6/2006 | Chesla | 726/22 |
| 2007/0226796 A1 * | 9/2007 | Gilbert et al. | 726/22 |

OTHER PUBLICATIONS

Network Security Using Cisco IOS IPS, Chapter 6, Cisco, Implementing Cisco IOS Network Security pp. 437-488.*

* cited by examiner

*Primary Examiner* — Venkat Perungavoor
*Assistant Examiner* — Amir Mehrmanesh
(74) *Attorney, Agent, or Firm* — Martin E. Hsia

(57) ABSTRACT

Heterogeneous sensors simultaneously inspect network traffic for attacks. A signature-based sensor detects known attacks but has a blind spot, and a machine-learning based sensor that has been trained to detect attacks in the blind spot detects attacks that fail to conform to normal network traffic. False positive rates of the machine-learning based sensor are reduced by iterative testing using statistical techniques.

10 Claims, No Drawings

HETEROGENEOUS SENSORS FOR NETWORK DEFENSE

TECHNICAL FIELD

The field of the invention relates to the simultaneous use of two sensors using different underlying inspection methods to detect the same threat to a computer network. Because the sensors use different approaches, they are heterogeneous. More specifically, the invention relates to a system for combining signature-based sensors and machine learning-based sensors to provide a full spectrum of network defense, while eliminating the blind spot and false positive rate problems each separate sensor experiences.

BACKGROUND ART

Computer network intrusion detection systems (sensors) rely mainly on signature-based sensing for malicious traffic detection. At a basic level, a signature is a definitive sequence of network communication data-streams (bits) that are characteristic of a known attack pattern. Generally, every known exploit or internet attack will have many signatures written for signature-based sensors' use in intrusion detection. A signature-based sensor library (database of signatures) must be updated constantly to keep up with the evolving variety and nature of internet attacks. An updated sensor will generally detect any attacks present in the network traffic for which it contains a valid signature. Additionally, false positive rates for signature-based sensors are usually low, meaning that they do not normally alert on normal (non-attack) network traffic.

One limitation of this method of attack detection is that it is based on a retrospective view; signature-based sensors can only detect known attacks for which they have an accurate signature in their libraries. All signature-based sensors exhibit blind spots which are defined by either categories of attacks for which no signatures have been established, or "zero day exploits" (new attacks) which have never been seen before. Additionally, all signature-based sensors tend to have similar blind spots because they typically subscribe to the same reference libraries of known malicious behavior. Two of the most widely used subscription libraries can be found at Snort.org and Symantec.com.

The blind spot problem for signature-based sensors is compounded by the fact that use of evasion techniques by hackers has proven very effective at enabling known exploits to escape detection. Evasion techniques allow a hacker to sufficiently modify the pattern of an attack so that the signature will fail to produce a match (during intrusion detection). The most common evasion techniques are obfuscation, fragmentation, and encryption. Obfuscation is hiding intended meaning in communication, making communication confusing, willfully ambiguous, and harder to interpret. In network security, obfuscation refers to methods used to obscure an attack payload from inspection by network protection systems. For instance, an attack payload can be hidden in web protocol traffic. Fragmentation is breaking a data stream into segments and sending those segments out of order through the computer network. The segments are reassembled in correct order at the receiving side. The shuffling of the order of data stream segments can change the known attack signature due to the reordering of communication bits. Encryption is the process of encoding messages (or information) in such a way that eavesdroppers or hackers cannot read it, but that authorized parties can. Both the authorized sender and receiver must have the same encryption key because the process of encoding and decoding is relatively the same. In network attacks, the attack payload can often be encoded/encrypted such that the signature is no longer readable by detection systems. While each evasion technique changes the attack pattern differently, it is important to note that the goal is the same: change the attack pattern enough to no longer match published attack signatures and hence to avoid intrusion detection.

Another type of intrusion detection system (sensor), which does not rely on signature libraries, is starting to be deployed on computer networks. These non-signature-based sensors use mathematical algorithms to perform either anomaly detection or categorical classification (machine learning). In anomaly detection, the sensor reviews network traffic, uses algorithms (mathematical methods) to form a mathematical model to represent the network traffic, and then alerts on any traffic that does not fit the model (anomalous). Anomaly detectors also use thresholds and rule sets to help bound the normal network traffic space, that is, to determine whether network traffic is normal or not. Machine-learning sensors are similar in that they use an algorithm to form a model, but they separate network traffic into multiple categories for each variant of network traffic (as opposed to an anomaly detector which uses only one category: "normal"). The model is automatically created by using the algorithm to process previously-tagged training samples containing network traffic from multiple categories. After such training, the machine learning sensor will review and analyze network traffic by placing each portion of network traffic into its "best fitting" category.

In both anomaly detection and categorical classification (machine learning), models are preferably created automatically using well known techniques, such as those disclosed in Bremner D, Demaine E, Erickson J, Iacono J, Langerman S, Morin P, Toussaint G (2005), "Output-sensitive algorithms for computing nearest-neighbor decision boundaries", Discrete and Computational Geometry 33 (4): 593-604. doi: 10.1007/s00454-004-1152-0, and D. Coomans; D. L. Massart (1982). "Alternative k-nearest neighbour rules in supervised pattern recognition: Part 1. k-Nearest neighbour classification by using alternative voting rules". Analytica Chimica Acta 136: 15-27. doi:10.1016/S0003-2670(01) 95359-0, both of which are hereby incorporated herein by reference.

These algorithm-based (anomaly detection and machine-learning) methods of sensing do not depend on referencing man-made signatures, but instead depend on the ability of the algorithms to learn about and recognize both normal and malicious traffic. During the learning process, the anomaly detection and machine-learning sensors are exposed to combinations of known normal and malicious traffic samples, so that their mathematical algorithms can develop a mathematical model of the network traffic. This process is known as sensor training. The benefit of using algorithm based (anomaly detection and machine-learning) sensors is that they can alert on either known attacks (even when evasion techniques are employed by the attacker) or on new attacks/ exploits (zero-days) that have never been used before.

However promising the use of algorithm-based sensors may be, in reality most algorithm-based sensors experience high false-positives rates. The more complex the computer network, the more difficult it is to train the algorithms to achieve acceptable performance levels to support effective computer network defense. An example of a high false-positive problem would be when a sensor alert report shows 10 attacks occurring, when there are only 5 actual attacks. This would be a false-positive rate of 50%. In a network defensive operation, where analysts must investigate every alert, time and effort is wasted investigating false alerts (false-positives). Thus a sensor with a high false-positive rate is not useful to network defense operations.

Computer network defense of large enterprise networks is a persistent problem that is growing more difficult and important to address as the prosperity of modern society becomes increasingly more dependent on networked computer systems. Network defense analysts know they are not catching all attacks and recognize that the problem is getting worse. Once a new attack is identified, defense personnel have to wait until subscription publishers update signature libraries before any protection is available. Typically, new attacks are not caught immediately and there is often a significant delay of from days to weeks before signatures are available for distribution to defense personnel. This retrospective view is inadequate for effective network intrusion defense.

A system is needed to provide the ability to detect the full spectrum of network attacks: known, pattern obscured, and "zero-day" attacks, with an acceptable false-positive rate. Algorithm-based sensors, combined with signature-based sensing, can provide this full spectrum of network defense while eliminating the blind spot and false positive rate problems each separate sensor experiences. We define this heterogeneous sensor combination as operationally using two sensors of different underlying inspection methods to detect the same threat. Also, for simplicity, the term "machine learning" shall hereinafter mean and include both anomaly detection and machine learning sensors.

DISCLOSURE OF THE INVENTION

The invention relates to a process for using signature-based and machine learning-based sensors in tandem to significantly improve computer network defense. Our process invention combines the strengths of each type of sensor while mitigating their individual weaknesses. The basic combination steps of the system are as follows:

Step 1. Determine and verify the blind spot of the signature-based sensor.
  Blind spot testing to find which evasion techniques work on that a particular signature-based sensor is the first step. The objective is to build a broad list of known exploits that go undetected by the sensor by altering attack patterns just enough to allow previously detectable attacks to avoid detection via their published signatures. "Zero-day" attacks can also be added to the list (if available). This step helps to identify what types of attacks are currently being missed by the sensor and provides training data for preparing the machine learning sensor to cover the signature-based sensor's blind spot.

Step 2. Build a machine-learning sensor training dataset.
  A training dataset is compiled that includes both attack (malicious) samples and sanitized, attack-free (normal) network traffic samples. The majority of the malicious samples come from completing step 1 properly. The normal traffic samples should be taken from the network access point where the sensors will be eventually deployed.

Step 3. Optimize the machine-learning sensor.
  After the training dataset is compiled with both malicious and normal network samples, the machine-learning sensor is trained and optimized though various statistical techniques like design of experiments, multi-factor interaction analysis, and analysis of variance, which are disclosed in Hinkelmann, Klaus and Kempthorne, Oscar (2008), Design and Analysis of Experiments. I and II (Second ed.), Wiley. ISBN 978-0-470-38551-7; Hinkelmann, Klaus and Kempthorne, Oscar (2008), Design and Analysis of Experiments, Volume I: Introduction to Experimental Design (Second ed.), Wiley. ISBN 978-0-471-72756-9; Hinkelmann, Klaus and Kempthorne, Oscar (2005), Design and Analysis of Experiments, Volume 2: Advanced Experimental Design (First ed.), Wiley. ISBN 978-0-471-55177-5; Tabachnick, Barbara G. & Fidell, Linda S. (2007), Using Multivariate Statistics (5th ed.), Boston: Pearson International Edition. ISBN 978-0-205-45938-4; and Gelman, Andrew (2005), "Analysis of variance? Why it is more important than ever", The Annals of Statistics 33: 1-53, doi: 10.1214/009053604000001048, all of which are hereby incorporated herein by reference.

Each machine-learning sensor algorithm is preferably individually optimized to increase its accuracy.

Step 4. Deploy the sensor combination on the live network.
  Now that the heterogeneous sensor pair has been created, the sensors can be used for network defense.

It is known to combine sensors of different technologies in Intrusion Detection and Prevention Systems, see Scarfone, Karen; Mell, Peter (February 2007), "Guide to Intrusion Detection and Prevention Systems (IDPS)", Computer Security Resource Center (National Institute of Standards and Technology) (800-94), incorporated herein by reference. However, the present invention actually combines two network-based sensors, instead of two different technologies.

BEST MODE FOR CARRYING OUT THE INVENTION

The following is a detailed description of the presently preferred embodiments.

Step 1. Determine and Verify the Blind Spot of a Signature-Based Sensor.

The first step in our training process involves using a signature-based sensor with an up-to-date signature library. Scripted attacks are presented to the signature-based sensor to determine the blind spot of the signature sensor. Our attack script is a battery of automated network attacks that covers enough breadth and depth of exploits that represents a comprehensive attack profile.

Penetration-testing tools are used to build an attack script consisting of a series of attacks representative of the known threats on the network to be defended. The script contains multiple types of attacks and their variants (using evasion techniques). This approach is similar to other automated penetration testing and vulnerability assessment tools, but was specifically designed by us for network sensor evaluation. Penetration testing and vulnerability assessment tools evaluate computer network nodes/targets and not the non-networked intrusion detection system sensors themselves. However, this new use of penetration testing tools is important for evaluating and discovering a sensor's blind spot.

Step 2. Build a Machine-Learning Sensor Training Dataset.

Machine-learning sensors require three different types of training data to build their models: 1) tagged normal, 2) tagged malicious, and 3) untagged network traffic samples. Traffic samples are created from packet-capture applications that make a copy of network traffic data-stream (bits) and store them in memory. The term "tagged" means that the training sample is presented to the machine-learning sensor with its category already determined and labeled.

The first type is tagged normal traffic from the network where the sensor combination will be employed. As one cannot guarantee the "cleanliness" of live network data, a variety of procedures to verify and sanitize the live network data is necessary to make the tagged normal traffic. These procedures include both manual and automated traffic inspection to verify the lack of network attacks in the normal traffic samples.

The second type is tagged malicious traffic (attack samples). This is traffic either culled from archives of attacks found on a live network, or attacks generated in a lab with the same hacker tools that would be used on a live network.

The third type of training data is untagged data. This data consists of straight network packet-capture, but without the sanitizing and labeling techniques administered above. This data contains both attacks and normal traffic (but not labeled) from the targeted network. Untagged data training is a machine learning technique for increasing the number of training samples without having to spend the arduous time and expense of labeling every sample. The machine-learning algorithms also employ other learning techniques that need the "untagged" data samples.

Step 3. Optimize the Machine-Learning Sensor.

Using the three types of training data described in the above section, the machine-learning sensor is trained to model the live network and to detect malicious attacks. Training, however, is just the term used by machine learning scientists for processing the training samples with the sensor's algorithm. After a baseline model is established (by the algorithm), iterative testing is done to increase the effectiveness (reduction of false positives) of the machine-learning sensor. The results of these iterative tests are analyzed using statistical tools to determine the best usage of the training data. Because of the iterative nature of this training, the sensor can be considered to be a heuristic sensor.

Step 4. Deploy the Sensor Combination on the Live Network.

A heterogeneous sensor pair is placed where the network training samples were taken. Each sensor is somewhat complementary to the other, so that (in addition to both detecting known attacks) they should each detect different types of attacks, thus creating cumulative synergy greater than their individual parts. The signature-based sensor will catch known, subscription library attacks (including any that are outside the machine learning sensors' training), and the machine learning sensors will catch known attacks that are within its training, as well as any variant (signature blind spot) attacks and "zero-days" that evade the signature-based sensor. Together, the heterogeneous sensor pair provides a comprehensive computer network intrusion detection system that has been lacking on contemporary networks.

Accordingly, as can be seen from the above, the invention is a process for defending a network of computers against attack, comprising inspecting network traffic for malicious data using a signature-based sensor and simultaneously inspecting the network traffic for malicious data using a machine-learning based sensor. The machine-learning based sensor has been trained to detect attacks on blind spots of the signature-based sensor by modifying patterns of attack on the signature-based sensor to compile blind spot malicious samples that avoid intrusion detection by the signature-based sensor. The blind spot malicious samples are then tagged as tagged malicious samples. Samples of a normal portion of normal network traffic patterns are then acquired and sanitized, to obtain normal samples, which are then tagged as tagged normal samples. The portions of the normal network traffic that are not in the normal portion are tagged as untagged samples. A machine-learning training dataset comprising the tagged malicious samples, the tagged normal samples, and the untagged samples, is then presented to the machine-learning based sensor to create models of normal network traffic and to detect samples that fail to conform to the models of normal network traffic as malicious data. The accuracy of the machine-learning sensor is then iteratively tested using the models of normal network traffic to reduce false positives and to achieve iteratively tested models of normal network traffic. The machine-learning sensor then recognizes malicious data as data that fails to conform to the iteratively tested models of normal traffic, with a reduced rate of false positives, and the signature-based sensor recognizes as malicious data any network traffic that matches signatures provided to said signature-based sensor.

The invention optionally further comprises acquiring archived malicious samples from archives of attacks on live networks, which are then tagging as malicious samples included in the machine-learning dataset.

The modifying step can be performed by applying evasion techniques to attacks that are detected by the signature-based sensor until the signature-based sensor fails to detect the attacks. Preferably, the evasion techniques are selected from the group consisting of obfuscation, fragmentation and encryption.

Preferably, the iteratively testing step is performed by using statistical techniques selected from the group consisting of design of experiments, multi-factor interaction analysis, and analysis of variance.

Preferably also, the acquiring step is performed at a location in the network where the sensors will be deployed.

A system according to the present invention comprises a network of computers, with a signature-based sensor and a machine-learning based sensor deployed in the network to simultaneously inspect network traffic for malicious data. The machine-learning based sensor recognizes as malicious data any network traffic that fails to conform to models of normal network traffic that have been iteratively tested to reduce false positives. The signature-based sensor recognizes as malicious data any network traffic that matches signatures provided to said signature-based sensor.

Preferably, the machine-learning sensor has been trained by a training process, comprising modifying patterns of attack on the signature-based sensor to compile blind spot malicious samples that avoid intrusion detection by the signature-based sensor. The training process includes tagging the blind spot malicious samples as tagged malicious samples, acquiring samples of normal network traffic patterns, sanitizing a normal portion of the samples of normal network traffic patterns to obtain normal samples, tagging the normal samples as tagged normal samples, and tagging a portion of the samples of normal network traffic that are not the normal portion as untagged samples. A machine-learning training dataset including the tagged malicious samples, the tagged normal samples, and the untagged samples, is then presented to the machine-learning based sensor to create models of normal network traffic and to detect samples that fail to conform to the models of normal network traffic as malicious data. The accuracy of the machine-learning based sensor is then iteratively tested using the models of normal network traffic to reduce false positives of the machine-learning based sensor and to achieve iteratively tested models of normal network traffic.

Preferably, the machine-learning sensor has been trained by a process further comprising acquiring archived malicious samples from archives of attacks on live networks, tagging the archived malicious samples as malicious and including the archived malicious samples in the machine-learning dataset.

Although the invention has been disclosed in connection with the presently preferred best mode described above, it should be understood that this disclosure includes words of description and illustration, rather than words of limitation. There may be other embodiments of the invention that fall within the spirit and scope of the invention, as defined by the claims. Accordingly, no limitations are to be implied or inferred in this invention except as specifically and explicitly set forth in the claims.

INDUSTRIAL APPLICABILITY

This invention is applicable wherever it is desired to protect computer networks against attacks.

What is claimed is:

1. A process for defending a network of computers against attack, comprising:
   inspecting network traffic for malicious data using a signature-based sensor; and
   simultaneously inspecting said network traffic for malicious data using a machine-learning based sensor;
      wherein said machine-learning based sensor has been trained to detect attacks on blind spots of said signature-based sensor by a process comprising;
      modifying patterns of attack on said signature-based sensor to compile blind spot malicious samples that avoid intrusion detection by said signature-based sensor;
      tagging said blind spot malicious samples as tagged malicious samples;
      acquiring samples of normal network traffic patterns;
      sanitizing a normal portion of said samples of normal network traffic patterns to obtain normal samples;
      tagging said normal samples as tagged normal samples; and
      tagging a portion of said samples of normal network traffic that are not said normal portion as untagged samples,
      presenting a machine-learning training dataset comprising said tagged malicious samples, said tagged normal samples, and said untagged samples, to said machine-learning based sensor to create models of normal network traffic and to detect samples that fail to conform to said models of normal network traffic as malicious data;
      iteratively testing accuracy of said machine-learning based sensor using said models of normal network traffic to reduce false positives of said machine-learning based sensor and to achieve iteratively tested models of normal network traffic;
   whereby said machine-learning sensor recognizes malicious data as data that fails to conform to said iteratively tested models of normal traffic, with a reduced rate of false positives; and
   whereby said signature-based sensor recognizes as malicious data any network traffic that matches signatures provided to said signature-based sensor.

2. A process according to claim 1, further comprising:
   acquiring archived malicious samples from archives of attacks on live networks; and
   tagging said archived malicious samples as malicious and including said archived malicious samples in said machine-learning dataset.

3. A process according to claim 1, wherein said modifying step is performed by applying evasion techniques to attacks that are detected by said signature-based sensor until said signature-based sensor fails to detect said attacks.

4. A process according to claim 3, wherein said evasion techniques are selected from the group consisting of obfuscation, fragmentation and encryption.

5. A process according to claim 1, wherein said iteratively testing step is performed by using statistical techniques selected from the group consisting of design of experiments, multi-factor interaction analysis, and analysis of variance.

6. A process according to claim 1, wherein said acquiring step is performed at a location in said network where said sensors will be deployed.

7. A system, comprising:
   a network of computers;
   a signature-based sensor and a machine-learning based sensor deployed in said network to simultaneously inspect network traffic for malicious data;
   wherein said machine-learning based sensor recognizes as malicious data any network traffic that fails to conform to models of normal network traffic that have been iteratively tested to reduce false positives; and
   wherein said signature-based sensor recognizes as malicious data any network traffic that matches signatures provided to said signature-based sensor;
   wherein said machine-learning based sensor has been trained by a process, comprising:
   modifying patterns of attack on said signature-based sensor to compile blind spot malicious samples that avoid intrusion detection by said signature-based sensor;
   tagging said blind spot malicious samples as tagged malicious samples;
   acquiring samples of normal network traffic patterns;
   sanitizing a normal portion of said samples of normal network traffic patterns to obtain normal samples;
   tagging said normal samples as tagged normal samples;
   tagging a portion of said samples of normal network traffic that are not said normal portion as untagged samples,
   presenting a machine-learning training dataset comprising said tagged malicious samples, said tagged normal samples, and said untagged samples, to said machine-learning based sensor to create models of normal network traffic and to detect samples that fail to conform to said models of normal network traffic as malicious data; and
   iteratively testing accuracy of said machine-learning based sensor using said models of normal network traffic to reduce false positives of said machine-learning based sensor and to achieve iteratively tested models of normal network traffic.

8. A system according to claim 7, wherein said machine-learning based sensor has been trained by a process further comprising:
   acquiring archived malicious samples from archives of attacks on live networks; and
   tagging said archived malicious samples as malicious and including said archived malicious samples in said machine-learning dataset.

9. A process for defending a network of computers having normal network traffic against attack, comprising:
   training a machine-learning based sensor to detect attacks on blind spots of a signature-based sensor by a process comprising;
   modifying patterns of attack on said signature-based sensor to compile blind spot malicious samples that avoid intrusion detection by said signature-based sensor;
   tagging said blind spot malicious samples as tagged malicious samples;
   acquiring samples of normal network traffic patterns;
   sanitizing a normal portion of said samples of normal network traffic patterns to obtain normal samples;

tagging said normal samples as tagged normal samples; and tagging a portion of said samples of normal network traffic that are not said normal portion as untagged samples, presenting a machine-learning training dataset comprising said tagged malicious samples, said tagged normal samples, and said untagged samples, to said machine-learning based sensor to create models of normal network traffic and to detect samples that fail to conform to said models of normal network traffic as malicious data;

iteratively testing accuracy of said machine-learning based sensor using said models of normal network traffic to reduce false positives of said machine-learning based sensor and to achieve iteratively tested models of normal network traffic;

whereby said machine-learning sensor recognizes malicious data as data that fails to conform to said iteratively tested models of normal traffic, with a reduced rate of false positives; and whereby said signature-based sensor recognizes as malicious data any network traffic that matches signatures provided to said signature-based sensor;

inspecting network traffic for malicious data using said signature-based sensor; and simultaneously inspecting said network traffic for malicious data using said machine-learning based sensor.

10. A process according to claim 9, further comprising:

acquiring archived malicious samples from archives of attacks on live networks; and tagging said archived malicious samples as malicious and including said archived malicious samples in said machine-learning dataset.

\* \* \* \* \*